United States Patent
Kim et al.

(10) Patent No.: US 10,018,861 B2
(45) Date of Patent: Jul. 10, 2018

(54) DISPLAY DEVICE

(71) Applicant: LG DISPLAY CO., LTD., Seoul (KR)

(72) Inventors: Jin Ryun Kim, Paju-si (KR); Won Taek Moon, Paju-si (KR); Sang Hyun Lee, Paju-si (KR); Su Jin Chang, Seoul (KR); Seoung Mo Kang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 100 days.

(21) Appl. No.: 14/708,539

(22) Filed: May 11, 2015

(65) Prior Publication Data

US 2015/0378207 A1   Dec. 31, 2015

(30) Foreign Application Priority Data

Jun. 25, 2014 (KR) ........................ 10-2014-0077975

(51) Int. Cl.
*G02F 1/1333* (2006.01)
*G02F 1/1335* (2006.01)
*F21V 8/00* (2006.01)

(52) U.S. Cl.
CPC ..... *G02F 1/133308* (2013.01); *G02B 6/0018* (2013.01); *G02B 6/0031* (2013.01); *G02F 1/133615* (2013.01); *G02F 2001/133325* (2013.01)

(58) Field of Classification Search
None
See application file for complete search history.

(56) References Cited

U.S. PATENT DOCUMENTS

| | | | | |
|---|---|---|---|---|
| 8,310,620 B2 * | 11/2012 | Yabe | .................... | G02B 6/002 349/61 |
| 2002/0001184 A1 * | 1/2002 | Kim | .................... | G02B 6/0031 362/633 |
| 2006/0044490 A1 * | 3/2006 | Ichioka | ............. | G02F 1/133308 349/58 |
| 2010/0128198 A1 * | 5/2010 | Kim | .................... | G02B 6/0088 349/61 |
| 2011/0026240 A1 * | 2/2011 | Hayashi | ............... | G02B 6/0065 362/97.1 |
| 2011/0141034 A1 * | 6/2011 | Lai | .......................... | G06F 3/041 345/173 |
| 2011/0254790 A1 * | 10/2011 | Suzuki | .................... | B32B 7/12 345/173 |
| 2012/0092867 A1 * | 4/2012 | Kasper | .................... | H05K 1/02 362/235 |
| 2012/0113369 A1 * | 5/2012 | Kim | ......................... | G09F 3/10 349/122 |
| 2015/0219824 A1 * | 8/2015 | Kunimochi | .......... | G02B 6/0031 362/609 |

(Continued)

FOREIGN PATENT DOCUMENTS

| CN | 102662256 A | 9/2012 |
|---|---|---|
| CN | 202330953 U | 9/2013 |

(Continued)

*Primary Examiner* — Ryan Crockett
(74) *Attorney, Agent, or Firm* — Dentons US LLP

(57) ABSTRACT

A display device is disclosed which includes: a liquid crystal panel; an optical member configured to apply light to the liquid crystal panel; and a wrapping film configured to wrap an upper surface, at least one side surface and at least a part of a lower surface of the optical member.

18 Claims, 12 Drawing Sheets

(56) References Cited

U.S. PATENT DOCUMENTS

| | | | |
|---|---|---|---|
| 2015/0260907 A1* | 9/2015 | Yang | G02B 6/0088 362/606 |
| 2016/0018690 A1* | 1/2016 | Chen | G02F 1/133308 349/58 |

FOREIGN PATENT DOCUMENTS

| | | |
|---|---|---|
| CN | 203202798 U | 9/2013 |
| JP | 6-300922 A | 10/1994 |
| JP | 2010-044953 A | 2/2010 |
| JP | 2010-122691 A | 6/2010 |
| JP | 2012-103687 A | 5/2012 |

\* cited by examiner

DISPLAY DEVICE

This present application claims priority under 35 U.S.C. § 119(a) to Korean Patent Application No. 10-2014-0077975 filed on Jun. 25, 2014, which is hereby incorporated by reference in its entirety for all purposes.

BACKGROUND OF THE INVENTION

Field of the Invention

The present application relates to a display device.

Discussion of the Related Art

In general, a liquid crystal display device displays a desired image by controlling light transmittances of liquid crystal cells, which are arranged in a matrix shape, according to image information signals. More specifically, the liquid crystal display device displays images on a liquid crystal panel using light irradiated from a backlight unit.

The liquid crystal display device using the above-mentioned principle has features of being thinner, lighter weight, lower power consumption and lower driving voltage as compared to, for example, a CRT. As such, the liquid crystal display device has been widely applied in a variety of fields.

For example, the liquid crystal display device is being used in office automation appliances, audio/video appliances and so on.

Such a liquid crystal display device controls light transmittances of liquid crystal cells using signals which are applied to a plurality of control switches arranged in a matrix shape. As such, a desired image is displayed on a screen.

The liquid crystal display devices are also being widely applied to monitors of computers, television receivers, and portable display devices, which include display devices of navigation systems for vehicles and mobile phones, and so on.

Such liquid crystal display devices are non-emissive type devices which display images by adjusting the quantity of light applied from an external light source. As such, it is necessary for the liquid crystal display device to have for a backlight unit which includes a separate light source and applies light to the liquid crystal panel.

The backlight unit includes: light emitting diodes (LEDs) used as a light source; a light guide plate disposed opposite to a light emission surface of the LEDs; and a plurality of optical sheets disposed on the light guide plate. Also, the backlight unit includes a guide panel configured to support the liquid crystal panel and prevent light leakage.

As the liquid crystal display device is being fabricated in large-sizes, mold fabrication and transport cost of the guide panel must be increased.

Also, it is difficult to realize a narrow bezel due to thickness, combining complexity and engaging property of the guide panel.

Moreover, a bottom cover disposed on the rear surface of the backlight unit increase thickness and weight of the liquid crystal display device. Furthermore, the bezel is hardly reduced due to combinative difficulty of the bottom cover and the guide panel must limit.

SUMMARY OF THE INVENTION

Accordingly, embodiments of the present application are directed to a display device that substantially obviates one or more of problems due to the limitations and disadvantages of the related art.

The embodiments relate to provide a display device which is adapted to have a narrow bezel and reduce weight and thickness by removing a guide panel.

Also, the embodiments relate to provide a display device which is adapted to realize a narrow bezel and reduce weight and thickness by removing a bottom cover.

Moreover, the embodiments relate to provide a display device which is adapted to realize a narrow bezel and reduce weight and thickness by providing a new film which is used instead of a guide panel and a bottom cover.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

A display device according to an aspect of the present embodiment includes: a liquid crystal panel; an optical member configured to apply light to the liquid crystal panel; and a wrapping film configured to wrap an upper surface, at least one side surface and at least a part of a lower surface of the optical member.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
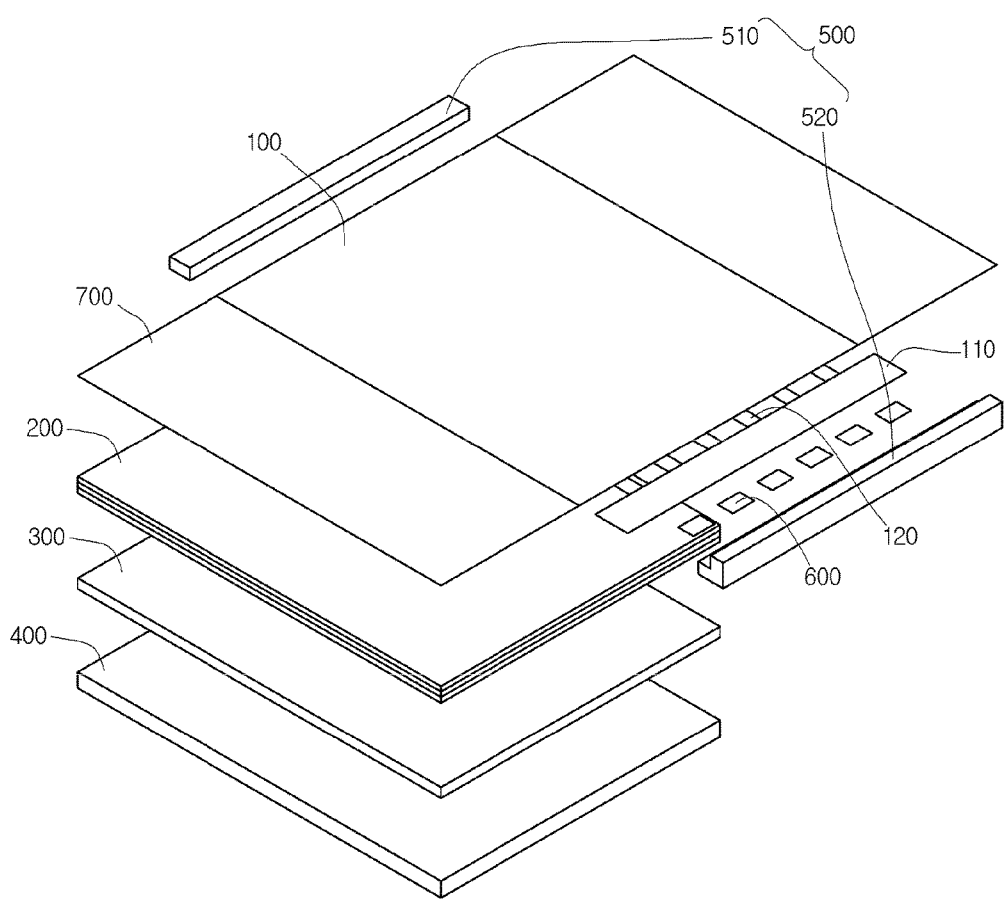
FIG. 1 is a perspective view showing a display device according to a first embodiment of the present disclosure.

Reference will now be made in detail to a display device in accordance with the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. In the drawings, the size, thickness and so on of a device can be exaggerated for the convenience of explanation. Wherever possible, the same reference numbers will be used throughout this disclosure including the drawings to refer to the same or like parts.

Advantages and features of the present disclosure, and implementation methods thereof will be clarified through the following embodiments described with reference to the accompanying drawings. These embodiments introduced hereinafter are provided as examples in order to convey their spirits to the ordinary skilled person in the art. As such, these embodiments might be embodied in a different shape, so are not limited to these embodiments described here. Therefore, the present disclosure must be defined by scopes of claims. The same reference numbers will be used throughout this disclosure to refer to the same or like parts. The size or the relative size of a layer or a region in the drawings can be exaggerated for the definiteness of explanation.

In the description of embodiments, when an element or a layer is described as being positioned "on or above" another element or layer, this description should be construed as including a case in which the elements or the layers directly contact each other as well as a case in which a third element or layer is interposed therebetween. Meanwhile, when an element or a layer described as being disposed "directly on or above" another element and layer, the elements or layers can directly contact each other without having any third element therebetween.

The spatial relative of "below, beneath, lower, above, upper and so on" can be used for easily explaining the mutual relation of an element or a component and another element or component shown in the drawing. Also, the spatial relative terms must be considered to include not only a direction of an element or a component shown in the drawing but also different directions of the element or component when the element or the component is used or driven. For example, when a construction can be turned upside down, an element or a component specified with "beneath" can be disposed "above" another element or component. In this case, the exemplified term of "beneath" can include both of "beneath" and "above".

The terms within the present disclosure are used for explaining embodiments, but they do not limit the present disclosure. As such, the singular forms used in the present disclosure are intended to include the plural forms, unless the context clearly indicates otherwise. The terms "comprises" and/or "comprising" described in the present disclosure specify the presence of stated components, steps, operations and/or elements, but do not preclude the presence or addition of one or more other components, steps, operations, elements and/or groups thereof.

FIG. 1 is a perspective view showing a display device according to a first embodiment of the present disclosure.

Referring to FIG. 1, a display device 10 according to an embodiment of the present disclosure can include a liquid crystal panel 100, optical sheets 200, a light guide plate 300, a reflection sheet 400, a guide panel 500, a light source 600 and a wrapping film 700.

Also, the display device 10 can include a printed circuit board (PCB) 110 and flexible printed circuit (FPC) films 120. The PCB 110 is used to drive the liquid crystal panel 100. The FPC films 120 provide an electrical path which is used to transfer signals from the PCB 110 to the liquid crystal panel 100.

The liquid crystal panel 100 can include a color filter array substrate, a thin film transistor array substrate and a liquid crystal layer interposed between the two substrates.

Although it is not shown in the drawing, the display device can further include an upper polarizing plate and a lower polarizing plate. The upper and lower polarizing plates are used to polarize light in directions crossing each other. To this end, the upper and lower polarizing plates can be attached to a front surface of the color filter array substrate and a rear surface of the thin film transistor array substrate.

Such a liquid crystal panel 100 includes a plurality of liquid crystal cells which is defined in a pixel unit and arranged in a matrix shape. In order to display an image, the liquid crystal panel 100 adjusts transmittances of the liquid crystal cells on the basis of image signal information applied from the PCB 110.

The thin film transistor array substrate includes pluralities of gate lines and data lines and thin film transistors (TFTs). The gate lines and the data lines are formed in a matrix shape. The TFTs are formed at crossings of the gate lines and the data lines.

A signal voltage transferred from the PCB 110 is applied between a pixel electrode on the thin film transistor array substrate and a common electrode, which will be explained later, on the color filter array substrate. The pixel electrode can receive the signal voltage via the respective TFT. Liquid crystal molecules between the pixel electrode and the common electrode are re-aligned according to the signal voltage. As such, transmittance of the liquid crystal cell can be defined or determined.

The optical sheets 200 can be configured with either a single optical sheet or a plurality of optical sheets.

Also, the optical sheets 200 can be formed in a single body obtained through a combination of plural optical sheets.

For example, the optical sheets 200 can include a diffusion sheet, a prism sheet and a protective sheet. As needed, the optical sheets 200 can include two diffusion sheets and two prism sheets. In this case, the diffusion sheet includes a base substrate and a coating layer formed on the base substrate in an embossed shape.

The diffusion sheet is used to diffuse light from the light source 600 and apply diffused light to the liquid crystal panel 100. Two or three diffusion sheets can be used in such a manner as to overlap with each other.

The prism sheets can be formed to have prisms which each have a triangular column shape and are arranged in its upper surface. The prism sheets are used to concentrate light diffused by the diffusion sheet in a perpendicular direction to the rear surface of the liquid crystal panel 100 which is disposed over the prism sheets. In general, two prism sheets are used in the display device. Each of micro prisms formed on the prism sheet is formed to have a fixed apex angle. As such, most light passing through the prism sheet progresses in the perpendicular direction to the liquid crystal panel 100. In accordance therewith, uniform brightness distribution can be provided. The protective sheet disposed in the uppermost layer is used to protect the prism sheet which is weak against scratches.

The light guide plate 300 guides light input from the light source disposed on its light input surface toward the rear surface of the liquid crystal panel 100.

Such a light guide plate 300 can be formed from a material which has high strength and transmittance and is not easily deformed or broken. For example, the light guide plate 300 can be formed from one of PMMA (polymethymethacrylate), PC (polycarbonate) and MS (methacrylate styrene). Also, the light guide plate 300 can be formed in either a wedge shape with an inclined lower surface and a flatted upper surface or a plate shape with flat upper and lower surfaces. The light guide plate 300 with the wedge shape can have a light input portion which is formed in a relatively large thickness compared to the other portions.

If the liquid crystal display device is applied to small appliances such as a notebook computer, cellular phone and so on, the light guide plate 300 with the wedge shape can be used in the liquid crystal display device. In this case, the light source 600 can be disposed by a side surface of the light guide plate 300 which has a high height.

The guide panel 500 can include first and second guide members 510 and 520 separated from each other.

The first guide member 510 can be disposed on one of two lower surface edges of the liquid crystal panel 100 opposite to each other. The second guide member 520 can be disposed on the other one of the two lower surface edges of the liquid crystal panel 100.

Such first and second guide members 510 and 520 can be formed together with the light guide plate 300 through a double-shot injection molding process. In other words, the first and second members 510 and 520 can be simultaneously injection-molded when the light guide plate 300 is injection-molded. The guide members 510 and 520 formed through the double-shot injection molding process can not only reduce the thickness of the guide panel 500 but also simplify the fabrication procedure of the liquid crystal display device.

One or both of the first and second guide members 510 and 520 can be formed together with the light guide plate 300 through the double-shot injection molding process.

The first and second guide members 510 and 520 separated from each other can be formed in a bar shape. The first guide member 510 can be formed without any height difference, but the second guide member 520 can be formed to have a height difference. In other words, the second guide member 520 can be formed in a stepped shape.

The light source 600 can include one of a cold cathode fluorescent lamp (CCFL), an external electrode fluorescent lamp (EEFL) and a light emitting diode (LED) element. In the display device according to an embodiment of the present disclosure, a light source 600 including LED elements will be described as an example. As such, the light source 600 can include LED elements and a substrate loaded with the LED elements.

The wrapping film 700 can support and fasten the optical sheets 200, the light guide plate 300 and the reflection sheet 400.

For the convenience of explanation, the optical sheets 200, the light guide plate 300 and the reflection sheet 400 will be called as 'an optical member'.

The wrapping film 700 fastens the optical member in such a manner as to wrap (or encompass) the optical member. Also, the wrapping film 700 can allow the optical member and the liquid crystal panel 100 to be combined with each other.

Figure 2:
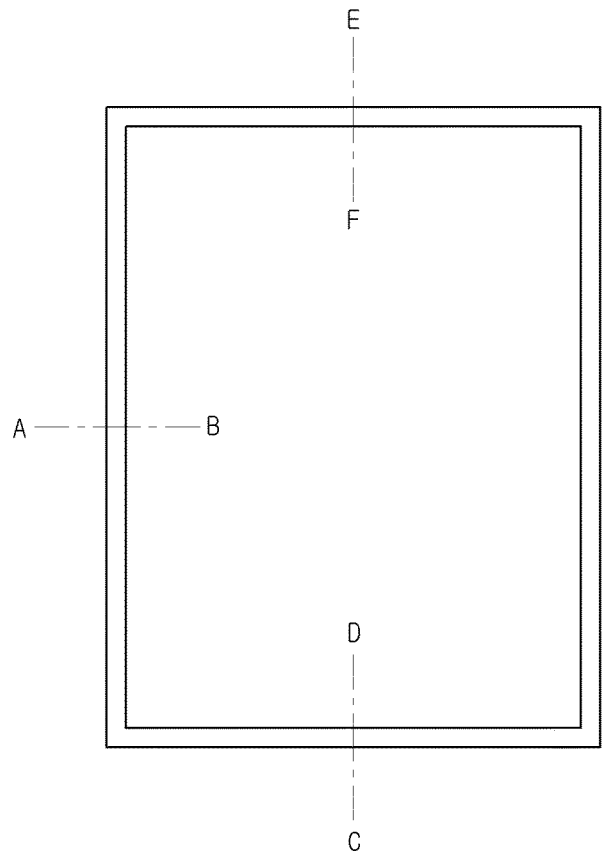
FIG. 2 is a planar view showing a display device according to a first embodiment of the present disclosure.
Figure 3:
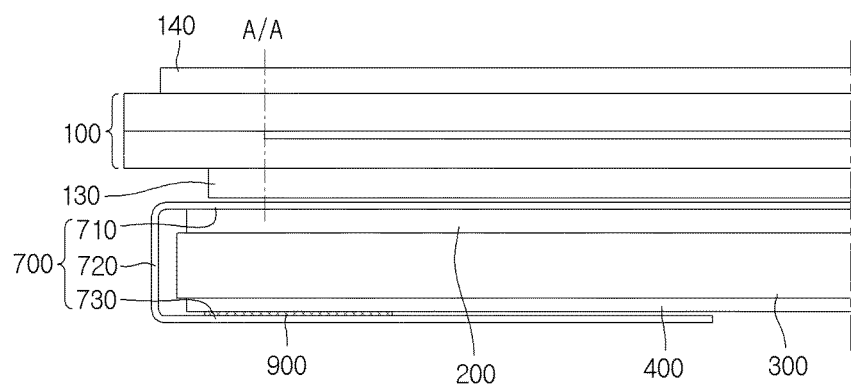
FIG. 3 is a cross-sectional view showing the display device taken along an alternated long and short dash line A-B in FIG. 2.
Figure 4:
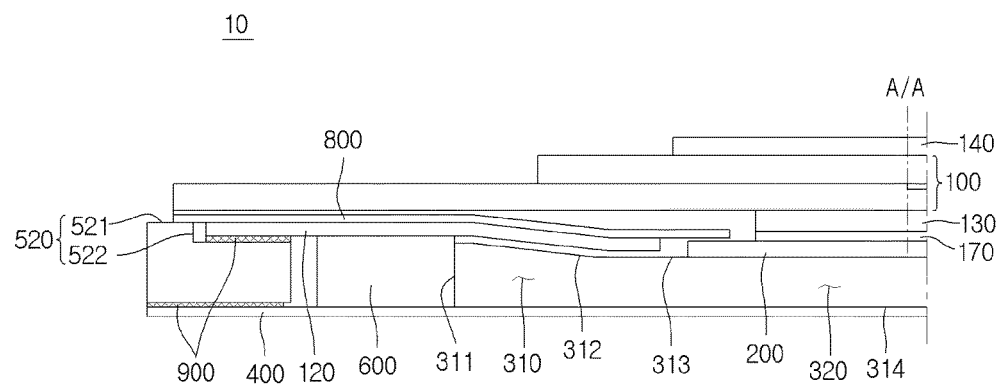
FIG. 4 is a cross-sectional view showing the display device taken along an alternated long and short dash line C-D in FIG. 2.
Figure 5:
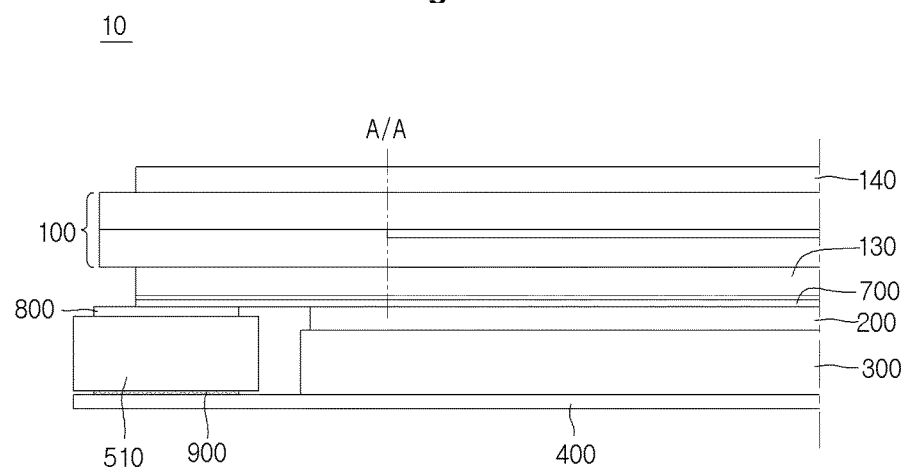
FIG. 5 is a cross-sectional view showing the display device taken along an alternated long and short dash line E-F in FIG. 2.

FIG. 2 is a planar view showing a display device 10 according to a first embodiment of the present disclosure. FIG. 3 is a cross-sectional view showing the display device taken along an alternated long and short dash line A-B in FIG. 2. FIG. 4 is a cross-sectional view showing the display device taken along an alternated long and short dash line C-D in FIG. 2. FIG. 5 is a cross-sectional view showing the display device taken along an alternated long and short dash line E-F in FIG. 2.

Referring to FIGS. 2 and 3, the liquid crystal panel 100 can be formed by combining the color filter array substrate and the thin film transistor array substrate. The lower polarizing plate 130 can be attached to the rear surface of the liquid crystal panel 100. The upper polarizing plate 140 can be attached to the upper surface of the liquid crystal panel 100.

An alternated long and short dash line A/A is a reference line which defines (or distinguishes) a display area and a non-display area. A left area of the alternated long and short dash line A/A corresponds to the non-display area. A right area of the alternated long and short dash line A/A corresponds to the display area which is used to display an image.

The non-display area can become a bezel. In order to realize a narrow bezel, it is necessary to reduce the area (or width) of the non-display area.

The optical member including optical sheets 200, a light guide plate 300 and a reflection sheet 400 can be disposed on the rear surface of the liquid crystal panel 100.

The wrapping film 700 can be interposed between the liquid crystal panel 100 and the optical member. In detail, the wrapping film 700 can be disposed in such a manner as to wrap the optical member.

The wrapping film 700 can be defined into a first area 710, a second area 720 and a third area 730.

The first area 710 of the wrapping film 700 is opposed to the upper surface of the optical sheets 200. The second area 720 of the wrapping film 700 is opposed to a side surface of the optical member. The third area 730 of the wrapping film 700 is opposed to a part (i.e., an edge) of the rear surface of the reflection sheet 400.

The first area 710 of the wrapping film 700 can cover the entire upper surface of the optical member (i.e., the entire upper surface of the uppermost sheet of the optical sheets 200). The third area 730 of the wrapping film 700 can cover the entire rear surface of the optical member (i.e., the entire rear surface of the reflection sheet 400) or one rear surface edge of the optical member (i.e., one rear surface edge of the reflection sheet 400).

The size of the third area 730 of the wrapping film 700 opposite to the rear surface of the optical member (i.e., the rear surface of the reflection sheet 400) can be determined under consideration of size and the fastening and supporting forces of the display device 10.

An adhesive layer can be formed in the first area 710 and the third area 730 of the wrapping film 700. As such, the wrapping film 700 corresponding to the first area 710 can be attached to the rear surface of the lower polarizing plate 130. Also, the wrapping film 700 corresponding to the third area 730 can be attached to the rear surface of the reflection sheet 400. Alternatively, the wrapping film 700 corresponding to the first area 710 and the third area 730 can be attached to the rear surfaces of the lower polarizing plate 130 and the reflection sheet 400 using double-faced adhesive tapes instead of the adhesive layer.

The adhesive layer can be formed from a pressure sensitive adhesive (PSA). The pressure sensitive adhesive (PSA) generates an adhesive force when a fixed pressure is applied.

The pressure sensitive adhesive (PSA) can be coated on the rear surface of the lower polarizing plate 130. As such, the wrapping film 700 corresponding to the first area 710 can be attached to the rear surface of the lower polarizing plate 130.

Such a wrapping film 700 can be used instead of a guide panel and a bottom cover which are disposed by side surfaces and in the lower surface of the related art display device.

Since the optical member and the liquid crystal panel 100 are fastened using the wrapping film 700, a separate guide panel and bottom cover can be removed. As such, the volume and weight of the display device can be reduced. Also, a minimized bezel can be realized.

In general, the small-sized display device 10 includes the optical member with a small size and a light weight. As such, the wrapping film 700 can sufficiently fasten the optical member and combine the optical member and the liquid crystal panel 100. In accordance therewith, components of the display device 10 can be stably supported and fastened within small-sized appliances, such as cellular phones, tablet personal computers, navigation systems and so on.

Referring to FIGS. 2 and 4, the second guide member 520 and the light source 600 can be arranged in one edge area of the reflection sheet 400. To this end, the reflection sheet 400 can be formed to have a wider area than that of the light guide plate 300.

The second guide member 520 can have a stepped shape with a height difference. The liquid crystal panel 100 can be placed on a first step (a higher step) 521 of the second guide member 520. The FPC film 120 can be placed on a second step (a lower step) 522 of the second guide member 520.

A first double-faced adhesive tape 800 can be interposed between the FPC film 120 and the liquid crystal panel 100. Also, second double-faced adhesive tapes 900 can be used to not only combine the second guide member 520 with the FPC film 120 but also fasten the second guide member 520 to one upper surface edge of the reflection sheet 400.

The light source 600 can be interposed between the second guide member 520 and one side surface of the light guide plate 300.

Although a gap (or space) is formed between the light source 600 and the second guide member 520 as shown in the drawings, the gap can be generated by a fabrication tolerance and have a very small width. As such, a PCB for applying a signal to the light source 600 can be disposed (or inserted) into the gap between the light source 600 and the second guide member 520. Alternatively, a heat radiation plate for discharging heat generated in the light source 600 can be disposed (or inserted) into the gap between the light source 600 and the second guide member 520.

The light guide plate 300 can include a light input portion 310 and a light non-input portion 320. The light input portion 310 can correspond to one edge portion of the light guide plate 300. The side surface of the light input portion 310 can become a light input surface 311. The light input surface 311 can face the light source 600 and receive light emitted from the light source 600.

The side surface and the rear surface of the light input portion 310 can be each formed in a flat surface, but the upper surface 312 of the light input portion 310 can be formed to have an inclined surface.

The light non-input portion 320 can include the other portion of the light guide plate 300 with the exception of the light input portion 310. The upper surface 313 and the rear surface 314 of the light non-input portion 320 can be each formed to have a flat surface.

Although it is not shown in the drawings, a light reflection layer can be coated on the rear surface of the light guide plate 300.

Referring to FIGS. 2 and 5, the first guide member 510 can be disposed on another edge area of the reflection sheet 400 opposite to the position of the second guide member 520. As such, the reflection sheet 400 can have a wider area compared to the rear surface of the light guide plate 300.

The first guide member 510 can be formed in a bar shape having any height difference. Such a first guide member 510 can be attached to the reflection sheet 400 using the second double-faced adhesive tape 900.

The liquid crystal panel 100 can be placed on the first guide member 510. In detail, one rear surface edge of the wrapping film 700 sequentially loaded with the lower polarizing plate 130 and the liquid crystal panel 100 can be fastened to the first guide member 510 by the second double-faced adhesive tape 900. As such, not only the lower polarizing plate 130 disposed on the wrapping film 700 but also the liquid crystal panel 100 disposed on the upper surface of the lower polarizing plate 130 can be stably fastened to the first guide member 510.

Although a gap is formed between the first guide member 510 and one side surface of the optical sheets 200 and the light guide plate 300, the gap can be a very small space caused by a fabrication tolerance. As such, the side surface of the optical sheets 200 and the light guide plate 300 can be supported in such a manner as to be attached to the first guide member 510. In accordance therewith, the optical sheets 200 and the light guide plate 300 can be stably fastened without any movement in upward and downward directions.

Figure 6:
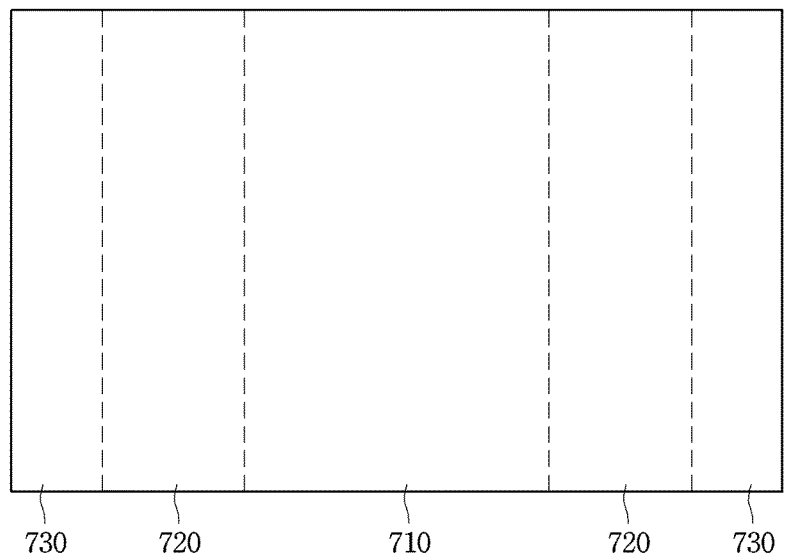
FIG. 6 is a planar view showing a wrapping film according to a first embodiment of the present disclosure.
Figure 7:
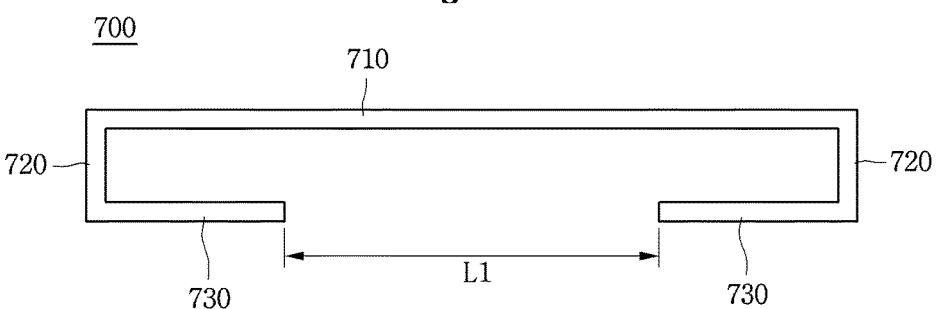
FIG. 7 is a cross-sectional view showing a shape of the wrapping film of FIG. 6 when encompassing optical sheets.

FIG. 6 is a planar view showing a wrapping film according to a first embodiment of the present disclosure. FIG. 7 is a cross-sectional view showing a shape of the wrapping film of FIG. 6 when encompassing optical sheets.

As shown in FIGS. 6 and 7, the wrapping film 700 according to a first embodiment of the present disclosure can be defined into first through third areas 710, 720 and 730.

In other words, the wrapping film 700 can be defined into the first through third areas 710, 720 and 730 which are distinguished by dotted lines.

The wrapping film 700 corresponding to the first area 710 can be opposed to (or overlapped with) the upper surface of the optical member (including the optical sheets, the light guide plate and the reflection sheet). As such, the first area 710 can be defined as an area opposite to the upper surface of the optical member.

Also, the wrapping film 700 corresponding to the second areas 720 can be opposed to (or overlapped with) side surfaces of the optical member. As such, the second areas 720 of the wrapping film 700 can be defined as areas opposite the side surfaces of the optical member.

Similarly, the wrapping film 700 corresponding to the third areas 730 can be opposed to (or overlapped with) the lower surface of the optical member. As such, the third areas 730 of the wrapping film 700 can be defined as areas opposite the lower surface of the optical member.

The first area 710 of the wrapping film 700 can be defined to have a wider area compared to the upper surface of the optical member. Alternatively, the first area 710 of the wrapping film 700 can be defined to have the same area as the upper surface of the optical member.

The second area 720 of the wrapping film 700 can be defined in a wider area than that of the side surface of the optical member. Alternatively, the second area 720 of the wrapping film 700 can be defined in the same area as the side surface of the optical member.

The third areas 730 of the wrapping film 700 can be disposed on two rear surface edges of the optical member opposite to each other.

The area of each of the third areas 730 opposite to (or overlapping with) the rear surface of the optical member depends on a first distance L1 between end lines of the third areas 730 facing each other in a state that the wrapping film 700 wraps (or encompasses) the optical member. The first distance L1 can be varied based upon the size of the display device 10, and fastening force and adhesive ability of the optical members.

Figure 8:
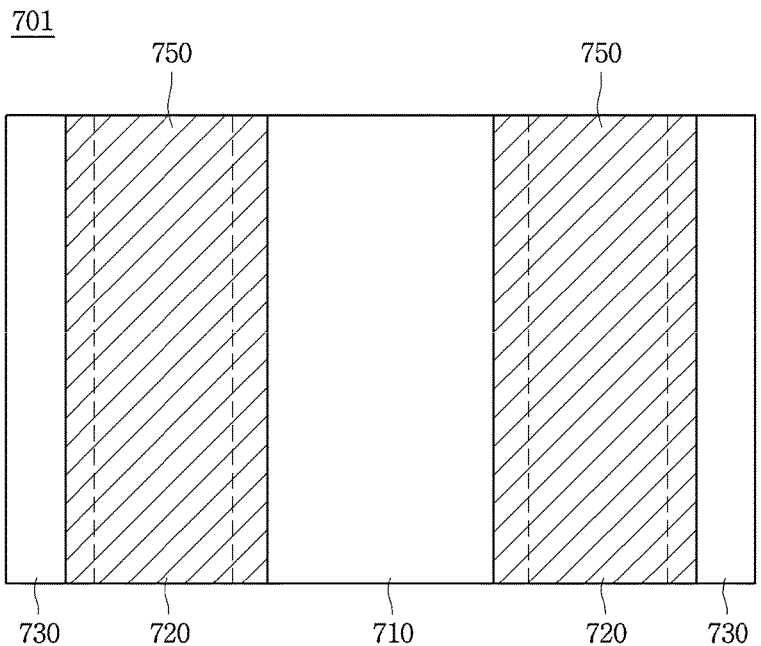
FIG. 8 is a planar view showing a light-shield-printed wrapping film according to a second embodiment of the present disclosure.
Figure 9:
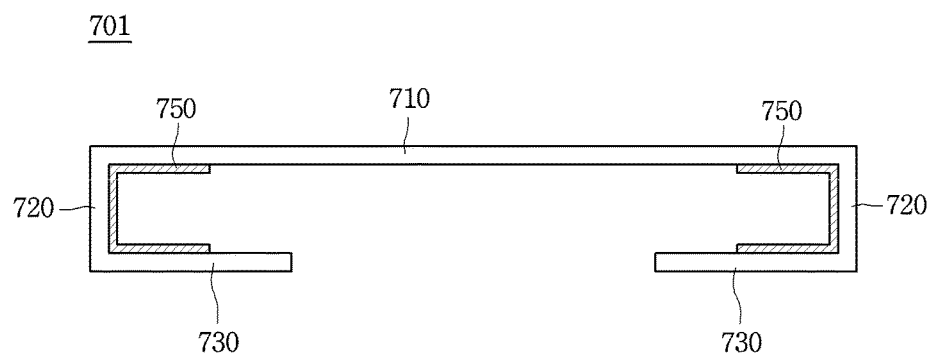
FIG. 9 is a cross-sectional view showing a shape of the light-shield-printed wrapping film of FIG. 8 when encompassing optical sheets.

FIG. 8 is a planar view showing a light-shield-printed wrapping film according to a second embodiment of the present disclosure. FIG. 9 is a cross-sectional view showing a shape of the light-shield-printed wrapping film of FIG. 8 when encompassing optical sheets.

A light-shield-printed wrapping film 701 according to a second embodiment of the present disclosure can be defined into a first area 710 occupying a central area, second areas disposed on both sides of the first area 710, and third areas 730 adjacent the second areas 720 in outer directions.

The light-shield-printed wrapping film 701 can include light shield patterns 750. The light shield patterns can be printed on a base film of the light-shield-printed wrapping film 701 in a thickness of about 10 μm.

The light shield pattern 750 can be used to intercept light leaking from the optical member. As such, leaked light cannot be externally recognized. Moreover, the reduction of brightness due to the light leakage can be prevented.

Each of the light shield patterns 750 can be formed not only on the entire second area 720, but also up to parts of the first and third areas 710 and 730 adjacent to the second area 720.

The area occupied by the light shield pattern 750 within each of the first and third areas 710 and 730 can be determined under consideration of size of the display device 10, light quantity leaking from the optical member and a fabrication tolerance.

The light shield pattern 750 printed in the second area 720 can intercept light leaking from one side surface of the optical member. The light shield pattern 750 printed in a part of the first area 710 can intercept light leaking from one upper surface edge area of the optical member. The light shield pattern 750 in a part of the third area 730 can intercept light leaking from one lower surface edge area of the optical member.

The base film of the light-shield-printed wrapping film 701 can be one of a TAC (tri acetyl cellulose) film, a PET (polyethylene terephthalate) film and a PC (polycarbonate) film.

The TAC film and PC film each have an advantage of low retardation. As such, light transferred from the optical member toward the liquid crystal panel 100 can be retarded in the first area 710 of the light-shield-printed wrapping film 701 opposite to (or overlapped with) the upper surface of the optical member.

In view of this point, it is necessary to design the display device 10 under consideration of the above-mentioned retardation phenomenon and the retardation degree by the optical sheets 200 and the lower polarizing plate 130. However, the TAC film and the PC film each having low retardation can enable complex optical design and the fabrication of the display device 10 to be simplified.

Meanwhile, the PET film can not only maintain hardness suitable to fasten the optical member but also reduce the thickness. As such, the display device 10 including the light-shield-printed wrapping film 701, which is formed from PET, has minimized thickness and bezel.

Figure 10:
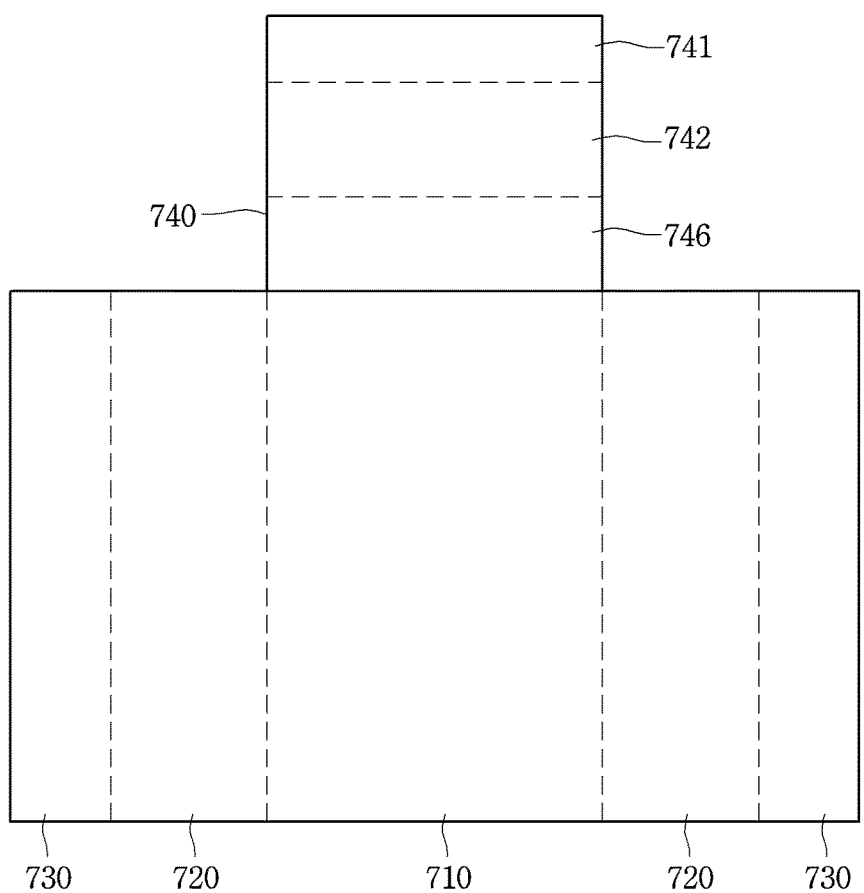
FIG. 10 is a planar view showing a wrapping film according to a third embodiment of the present disclosure.

FIG. 10 is a planar view showing a wrapping film according to a third embodiment of the present disclosure.

In the wrapping films 700 and 701 according to the first and second embodiments described in FIGS. 6 through 9, the second and third areas 720 and 730 are sequentially arranged in outward directions based on each the left and right edges of the first area 710. Meanwhile, the wrapping film 702 according to a third embodiment of the present disclosure can be defined to further include a fourth area 740, which is expanded from the top edge of the first area 710 in an outward direction and corresponds to a top wing, with the exception of the second and third areas 720 and 730 sequentially and outwardly arranged from the left and right edges of the first area 710.

A portion of the wrapping film 702 corresponding to the fourth area 740 can be formed in a single body united with portions corresponding to the first through third areas 710, 720 and 730. As such, the wrapping film 702 defined into the first through fourth areas 710, 720, 730 and 740 can be fabricated through a single process.

The portion of the wrapping film 702 corresponding to the fourth area 740 can cover upper and side surfaces of the first guide member 510 and one rear surface edge area of the reflection sheet 400.

The fourth area 740 can be defined into a first sub-area 741, a second sub-area 742 and a third sub-area 746 which are distinguished by dotted lines.

The first sub-area 741 can be opposed to (or overlapped with) the rear surface edge area of the reflection sheet 400. The second sub-area 742 can be opposed to (overlapped with) the side surface of the first guide member 510. The third sub-area 746 can be opposed to (or overlapped with) the upper surface of the first guide member 510.

Such a portion of the wrapping film 702 corresponding to the fourth area 740 can be bent like the portions corresponding to the second and third areas 720 and 730 shown in FIGS. 7 and 9. In accordance therewith, the first guide member 510 can be wrapped (or encompassed) with the portion of the wrapping film 702 corresponding to the fourth area 740.

Figure 11:
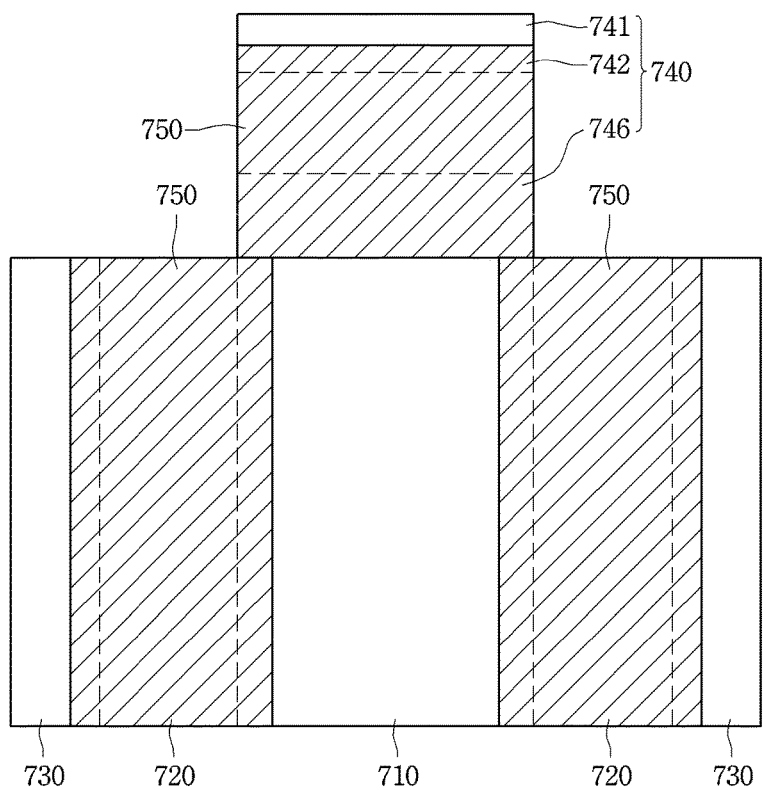
FIG. 11 is a planar view showing a light-shield-printed wrapping film according to a fourth embodiment of the present disclosure.

FIG. 11 is a planar view showing a light-shield-printed wrapping film according to a fourth embodiment of the present disclosure.

Referring to FIG. 11, a light-shield-printed wrapping film 703 according to a fourth embodiment of the present disclosure can further include light shield patterns 750 printed in the second areas 720 and the fourth area 740, unlike that of the third embodiment. The light shield patterns 750 printed in the second areas 720 have the same shape and function as those of the second embodiment. As such, the description for the light shield patterns in the second areas 720 will be omitted.

The light shield pattern printed in the fourth area 740 can intercept light leaking between side surfaces of the first guide member 510 and the optical member. Also, the light shield pattern 750 printed in the fourth area 740 can intercept light leaking from an upper surface edge of the optical member. Moreover, the light shield pattern printed in the fourth area 740 can intercept light leaking from a lower surface edge of the optical member.

Figure 12:
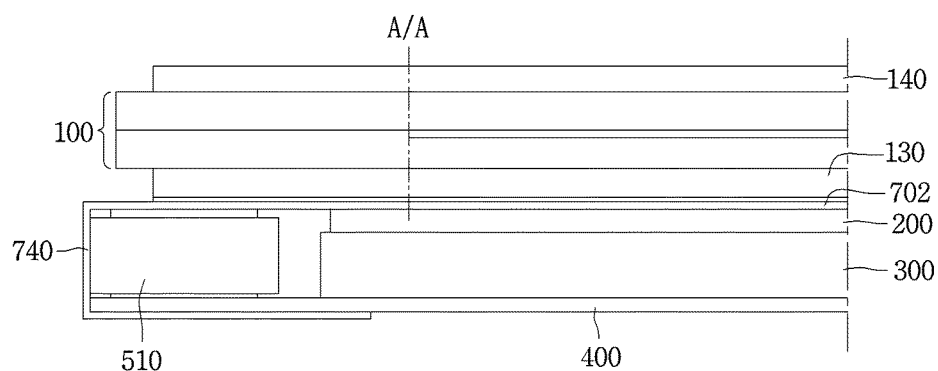
FIG. 12 is a cross-sectional view showing a display device, which includes the wrapping film of FIG. 10 and is taken along an alternated long and short dash line E-F in FIG. 2, according to a second embodiment of the present disclosure.

FIG. 12 is a cross-sectional view showing a display device, which includes the wrapping film of FIG. 10 and is taken along an alternated long and short dash line E-F in FIG. 2, according to a second embodiment of the present disclosure.

Referring to FIG. 12, a display device according to a second embodiment of the present disclosure can include a liquid crystal panel 100 used to display images, upper and lower polarizing plates 140 and 130 disposed on upper and lower surfaces of the liquid crystal panel 100, and an optical member configured to apply light to the liquid crystal panel 100. The optical member can include optical sheets 200, a light guide plate 300 disposed under the optical sheets 200, and a reflection sheet 400 disposed on the rear surface of the light guide plate 300 and configured to reflect light. Also, the display device can include a wrapping film 702 configured to wrap (or encompass) the optical member and fasten the optical member and the liquid crystal panel 100.

The liquid crystal panel 100 (i.e., an edge of the lower polarizing plate 130) can be disposed on the first guide member 510.

The wrapping film 702 is formed to further include a fourth area 740 as shown in FIG. 10. The fourth area 740 of the wrapping film 702 can wrap (or encompass) the first guide member 510. As such, the wrapping film 702 can support and fasten both of the first guide member 510 and the optical member. In accordance therewith, the fastening and supporting forces for the first guide member 510 and the optical member can be reinforced.

Figure 13:
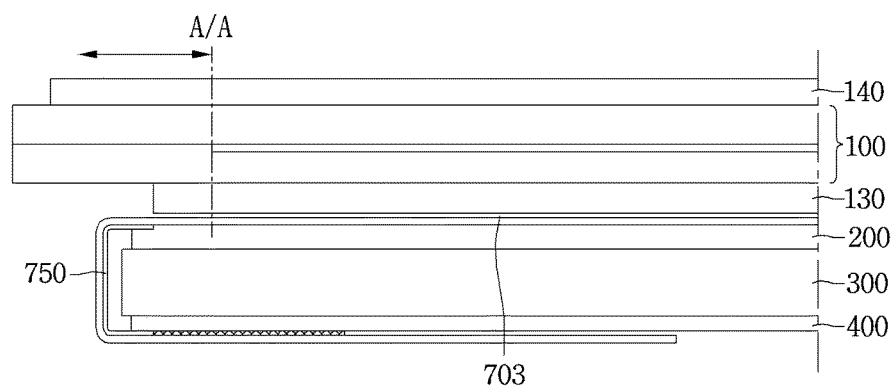
FIG. 13 is a cross-sectional view showing a display device, which includes the light-shield-printed wrapping film of FIG. 11 and is taken along an alternated long and short dash line A-B, according to a third embodiment of the present disclosure.
Figure 14:
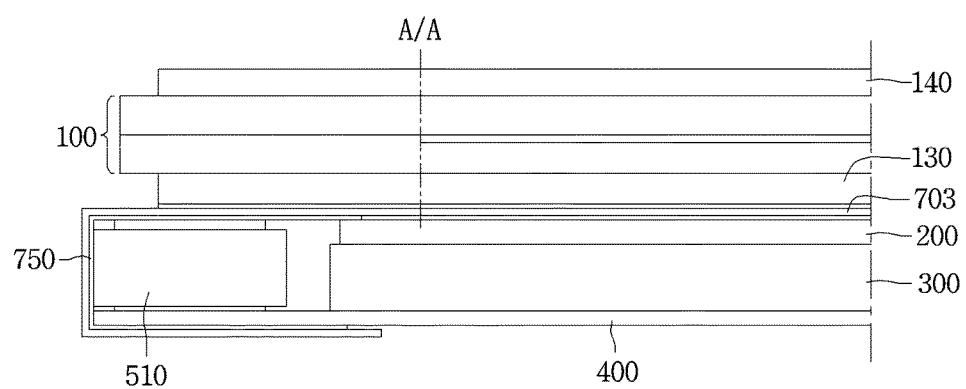
FIG. 14 is a cross-sectional view showing a display device, which includes the light-shield-printed wrapping film of FIG. 11 and is taken along an alternated long and short dash line E-F in FIG. 2, according to a third embodiment of the present disclosure.

FIG. 13 is a cross-sectional view showing a display device, which includes the light-shield-printed wrapping film of FIG. 11 and is taken along an alternated long and short dash line A-B, according to a third embodiment of the present disclosure. FIG. 14 is a cross-sectional view showing a display device, which includes the light-shield-printed wrapping film of FIG. 11 and is taken along an alternated long and short dash line E-F in FIG. 2, according to a third embodiment of the present disclosure. The display device of the third embodiment has the same configuration as that of the second embodiment in the exception of including a light-shield-printed wrapping film 703 instead of the wrapping film 702. The description of the third embodiment overlapping with the second embodiment will be omitted.

Referring to FIGS. 13 and 14, the light-shield-printed wrapping film 703 can include light shield patterns 750 printed in the second areas 720 and the fourth area 740.

The light shield pattern 750 printed in the second area 720 of the wrapping film 703 can be formed in such a manner as to cover one upper surface edge, one side surface and one lower surface edge of the optical member as shown in FIG. 13. As such, the light shield pattern 750 printed in the second area of the wrapping film 703 can intercept lights leaking from the upper surface edge, the side surface and the lower surface edge of the optical member.

The light shield pattern 750 printed in the fourth area 740 of the wrapping film 703 can be formed in such a manner as to cover one upper surface edge and one lower surface edge of the optical member and one side surface and upper and lower surfaces of the first guide member 510 as shown in FIG. 14. As such, the light shield pattern printed in the fourth area 740 of the wrapping film 703 can intercept light leaking between side surfaces of the first guide member 510 and the optical member. Also, the light shield pattern 750 printed in the fourth area 740 of the wrapping film 703 can intercept light leaking from an upper surface edge of the optical member. Moreover, the light shield pattern printed in the fourth area 740 of the wrapping film 703 can intercept light leaking from a lower surface edge of the optical member.

Figure 15:
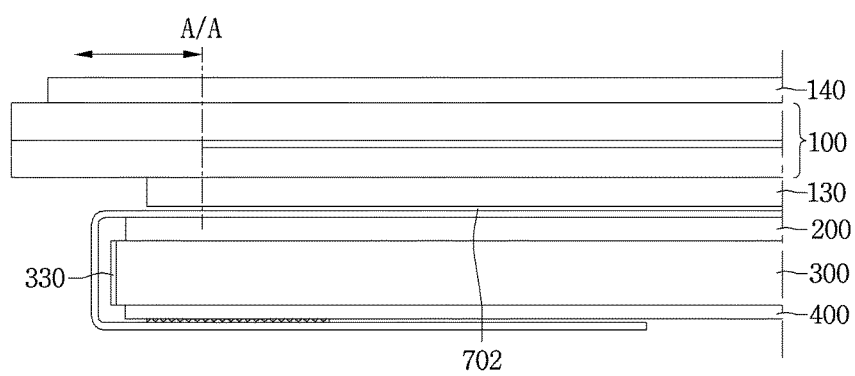
FIG. 15 is a cross-sectional view showing a display device, which is taken along an alternated long and short dash line A-B in FIG. 2, according to a fourth embodiment of the present disclosure.
Figure 16:
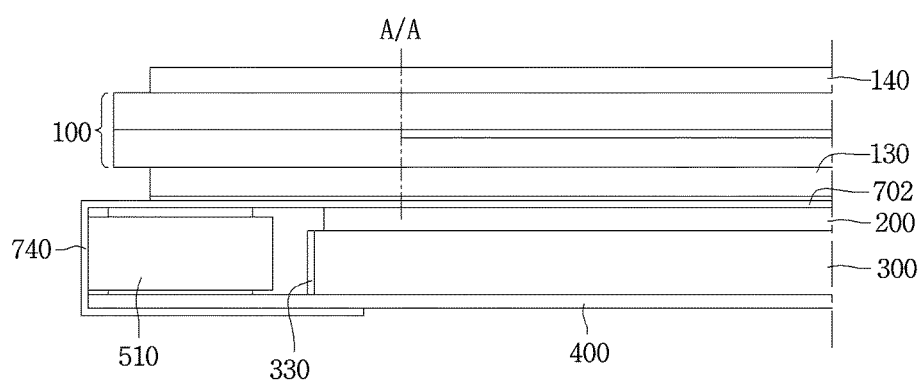
FIG. 16 is a cross-sectional view showing a display device, which is taken along an alternated long and short dash line E-F in FIG. 2, according to a fourth embodiment of the present disclosure.

FIG. 15 is a cross-sectional view showing a display device, which is taken along an alternated long and short dash line A-B in FIG. 2, according to a fourth embodiment of the present disclosure. FIG. 16 is a cross-sectional view showing a display device, which is taken along an alternated long and short dash line E-F in FIG. 2, according to a fourth embodiment of the present disclosure. The display device of the fourth embodiment has the same configuration as that of the second embodiment in the exception of further including a first light shield layer printed in the edge portion of the light guide plate 300. The description of the fourth embodiment overlapping with the second embodiment will be omitted.

Referring to FIGS. 15 and 16, the display device 10 according to a fourth embodiment of the present disclosure can include a first light shield layer 330 printed in the light guide plate 300. In other words, the display device 10 can include an ink-printed light guide plate.

The first light shield layer 330 can be printed on at least one among a top side surface and left and right side surfaces of the light guide plate 300 with the exception of the light input surface 311 corresponding to a bottom side surface.

The first light shield layer 330 can be formed through a pad printing process.

The pad printing process can print an ink on an object by transcribing the ink on a silicon pad designed in a fixed shape and bringing the ink-transcribed silicon pad into contact with the object. Such a pad printing process has high applicability for desired shape and size of target object.

The light guide plate 300 used in a small-sized display device 10 must become smaller. As such, left, right, top and bottom side surfaces of the light guide plate 300 must have very small areas. In this case, the pad printing process can easily print an light shield layer on the side surfaces of the light guide plate 300. However, the present disclosure is not limited to the pad printing process. In other words, one of different ink printing methods can be applied to the formation of the light shield layer according to the size of the display device 10 or the size of the light guide plate 300.

The first light shield layer 330 printed on side surfaces of the light guide plate 300 as shown in FIGS. 15 and 16 can be formed from a white ink.

Such a first light shield layer 330 can be used to reflect light leaking from the side surfaces of the light guide plate 300 with the exception of the light input surface toward the inside of the light guide plate 300. The first light shield layer 330 used to prevent light leakage is formed from the white ink, but it is not limited to this. Alternatively, the first light shield layer 330 can be formed from one of different color inks suitable to effectively intercept light.

The display device 10 of the fourth embodiment can intercept light leaking the light guide plate 300 even though the wrapping film 700 or 702 not having any light shield pattern is used. Alternatively, a wrapping film 701 or 703 printed with the light shield patterns 750 and the first light shield layer 330 printed on the light guide plate 300 can be applied to the display device 10. In this case, the display device 10 can maximize the interception (or prevention) effect of leak light.

Figure 17:
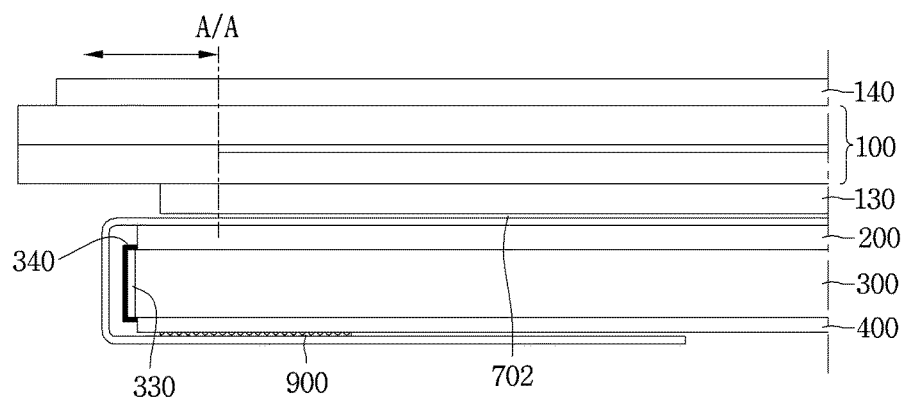
FIG. 17 is a cross-sectional view showing a display device, which is taken along an alternated long and short dash line A-B in FIG. 2, according to a fifth embodiment of the present disclosure.
Figure 18:
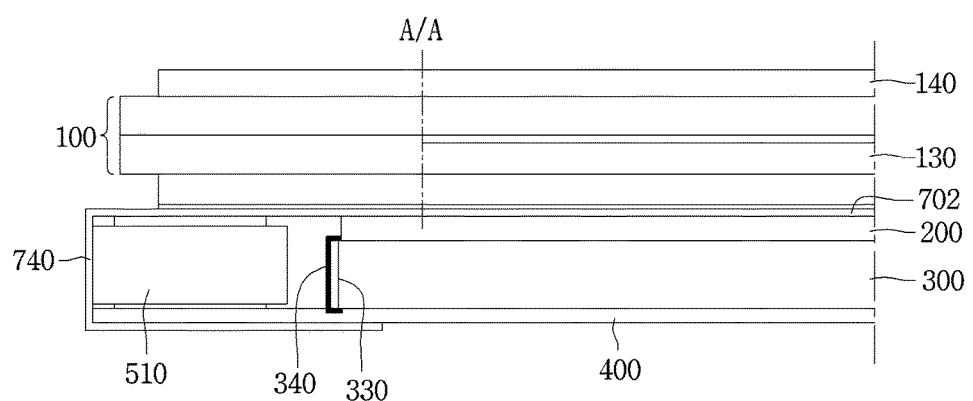
FIG. 18 is a cross-sectional view showing a display device, which is taken along an alternated long and short dash line E-F in FIG. 2, according to a fifth embodiment of the present disclosure.

FIG. 17 is a cross-sectional view showing a display device, which is taken along an alternated long and short dash line A-B in FIG. 2, according to a fifth embodiment of the present disclosure. FIG. 18 is a cross-sectional view showing a display device, which is taken along an alternated long and short dash line E-F in FIG. 2, according to a fifth embodiment of the present disclosure. The display device of the fifth embodiment has the same configuration as that of the fourth embodiment in the exception of further including a first light shield layer printed in the edge portion of the light guide plate 300. The description of the fifth embodiment overlapping with the fourth embodiment will be omitted.

Referring to FIGS. 17 and 18, the display device 10 according to a fifth embodiment of the present disclosure can include first and second light shield layers 330 and 340 stacked on a light guide plate 300.

The second light shield layer 340 can be formed using the same process as the first light shield layer 330. Also, the second light shield layer 340 can be formed by re-performing the formation process of the first light shield layer 330 after forming the first light shield layer 330.

The first light shield layer 330 can be formed from a color ink suitable to reflect light toward the inside of the light guide plate 300. The second light shield layer 340 can be formed from another color ink suitable to intercept light.

The color ink for intercepting light can become a black ink, but it is not limited to this. Alternatively, one of different color inks possible to intercept light can be used in the formation of the second light shield layer 340.

The first light shield layer 330 can be formed on side surfaces of the light guide plate 300 with the exception of the light input surface 311. The second light shield layer 340 can be formed side surfaces of the light guide plate 300, on which the first light shield layer 330 is formed, and upper and lower surface edges of the light guide plate 300 adjacent thereto. In other words, the second light shield layer 340 can be formed on the first light shield layer 330 and upper and lower surface edges of the light guide plate 300 adjacent to the first light shield layer 340.

The first light shield layer 330 can be used to reflect light leaking from the light guide plate 300 toward the inside of the light guide plate 300. The second light shield layer 340 can shield (or intercept) light leaking from the first light shield layer 330 and lights leaking the upper and lower surface edges of the light guide plate 300.

Such first and second light shield layers 330 and 340 can prevent an external visualization phenomenon of leak light and deterioration of brightness.

Figure 19:
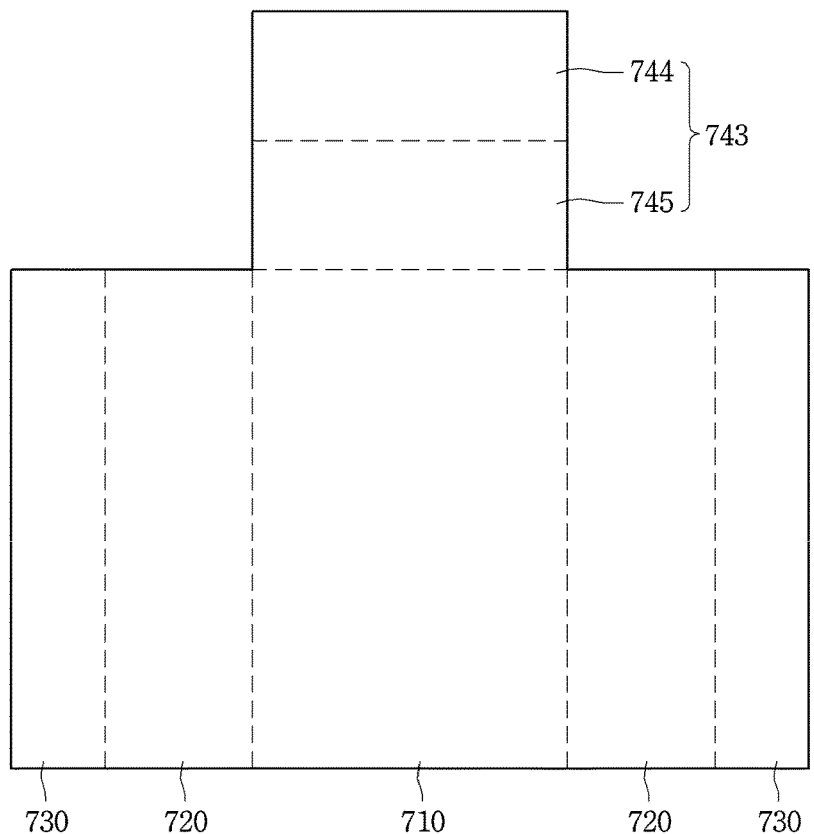
FIG. 19 is a planar view showing a wrapping film according to a fifth embodiment of the present disclosure.
Figure 20:
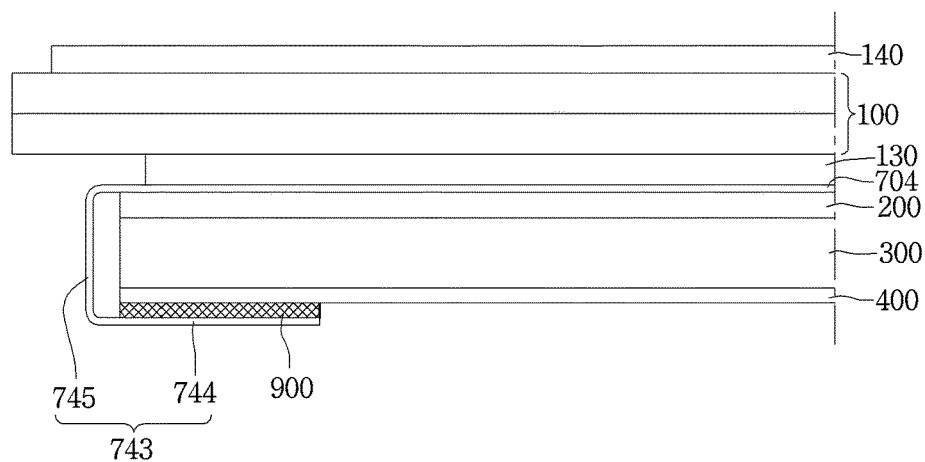
FIGS. 20 through 22 are cross-sectional views showing display devices, which each include the wrapping film of FIG. 19 and are taken along an alternated long and short dash line E-F in FIG. 2, according to sixth through eighth embodiments of the present disclosure.
Figure 21:
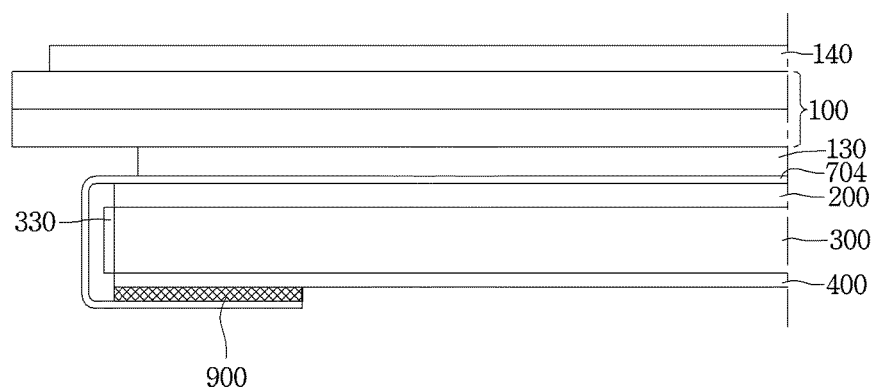
Figure 22:
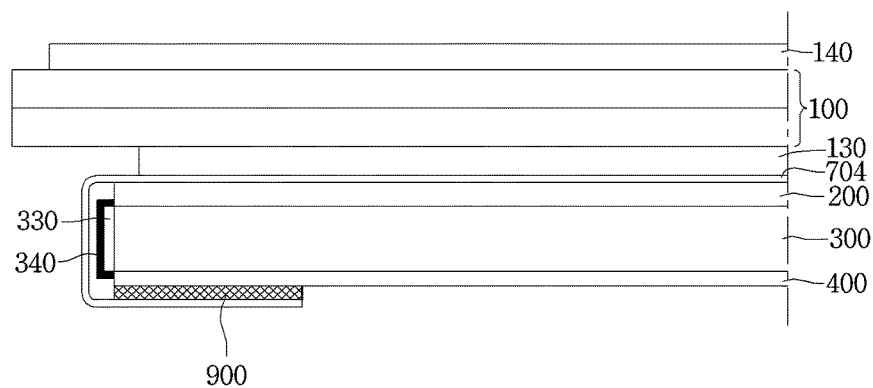

FIG. 19 is a planar view showing a wrapping film according to a fifth embodiment of the present disclosure. FIGS. 20 through 22 are cross-sectional views showing display devices, which each include the wrapping film of FIG. 19 and are taken along an alternated long and short dash line E-F in FIG. 2, according to sixth through eighth embodiments of the present disclosure.

Referring to FIGS. 20 through 22, display devices 10 according to a sixth through eighth embodiments of the present disclosure each have the similar configuration to those of the previous embodiments with the exception of removing the first guide member 510.

Such display devices 10 each include only a second guide member 520 disposed in a bottom edge area in which the light source 600 is disposed. In other words, a guide member is not disposed in any of left, right and top edge of the display device 10. In this case, the liquid crystal panel 100 and the optical member (including optical sheets 200, a light guide plate 300 and a reflection sheet 400) are combined with each other by a wrapping film 704. The wrapping film 704 can be used instead of left, right and top edge portions of the guide panel of the related art display device and the bottom cover of the related art display device disposed under the optical member.

In this manner, the liquid crystal panel 100 and the optical member are combined with each other by means of the wrapping film 704 without including the first guide member 510. As such, the display devices of the sixth through eighth embodiments can reduce the bezel within the bezel in not only the left and right edge areas but also the top edge area (opposite to the disposition area of the light source).

The wrapping film 704 according to a fifth embodiment of the present disclosure can be defined to include a first area 710 and second and third areas 720 and 720 which expand from left and right edges of the first area 710 in outward directions, as shown in FIG. 19. The wrapping film 704 can be defined to further include a fourth area 743, which expands from the top edge of the first area 710 in another outward direction, with the exception of the second and third areas 720 and 730.

The portion corresponding to the fourth area 743 can be formed in a single body united with the portions corresponding to the first through third areas 710, 720 and 730. Also, the portion corresponding to the fourth area 743 can be simultaneously formed with the portions corresponding to the first through third areas 710, 720 and 730 through the same formation process.

The fourth area 743 can be defined into a first sub-area 744 and a second sub-area 745. The first sub-area 744 can be opposed to (or overlapped with) the top edge area of the rear surface of the optical member as shown in FIG. 20. The second sub-area 745 can be opposed to (or overlapped with) the top side surface of the optical member.

In detail, the first sub-area 744 can face (or overlap with) the top edge area of the rear surface of the reflection sheet 400. Also, the first area 744 can be attached to the top edge area of the rear surface of the reflection sheet 400 by means of an adhesive member such as a double-faced tape 900.

The second sub-area 745 can face (or overlap with) the side surfaces of the optical sheets 200, the side surface of the light guide plate 300 and the side surface of the reflection sheet 400.

Although it is not shown in the drawings, adhesive members such as double-faced tapes can be used to attach the first area 710 of the wrapping film 704 to the rear surface of the lower polarizing plate 130 and the upper surface of the optical sheets 200.

Referring to FIG. 21, the display device 10 according to a seventh embodiment of the present disclosure can further include a first light shield layer 330, compared to that of the sixth embodiment. The first light shield layer 330 can reflect light leaking from the light guide plate 300 toward the inside of the light guide plate 300. As such, the display device 10 of the seventh embodiment can prevent a light leaking phenomenon of the light guide plate 300.

The display device 10 according to an eighth embodiment of the present disclosure can further include a first light shield layer 330 and a second light shield layer 340 compared to that of the sixth embodiment, as shown in FIG. 22. The second light shield layer 340 can shield light leaking from the first light shield layer 330. Also, the second light shield layer 340 can shield lights leaking from upper and lower surface edge areas of the light guide plate 300.

Such first and second light shield layers 330 and 340 can prevent not only an external visualization phenomenon due to light leakage but also the deterioration of brightness. Also, the first and second light shield layers 330 and 340 can increase brightness above a desired degree. Moreover, the first and second light shield layers 330 and 340 can reduce a power consumption quantity corresponding to the increment of brightness.

The display devices according to embodiments of the present disclosure allow the liquid crystal panel 100 and the optical member to be fastened by means of the wrapping film 700, 701, 702, 703 or 704. As such, guide members disposed in left and right edges or top and bottom edges of the display device and also the bottom cover can be removed. The thickness and weight of the display device and the bezel can be reduced. In detail, the bezels of the left and right edges of the display device 10 can be reduced below 0.6 mm. Also, the bezel of the top edge of the display device 10 can be reduced below 1 mm. In accordance therewith, the display devices according to embodiments of the present disclosure can optimize sense of visual immersion of a user. Moreover, the total thickness of the display device 10 can be reduced below 1.2 mm.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents without being limited to the description of the present disclosure.

What is claimed is:

1. A display device comprising:
    a display panel having first and second sides substantially parallel to each other;
    a light guide plate at a lower surface of the display panel;
    a reflection sheet at a lower surface of the light guide plate;
    a guide panel member, which supports and guides the display panel, on a lower surface of a side substantially perpendicular to the first and second sides of the display panel;
    a wrapping film on a lower surface of the first and second sides of the display panel that wraps around an upper surface, wraps around at least one side surface of the light guide plate and wraps around at least a part of a lower surface of the reflection sheet, but does not wrap around any portion of the guide panel member on a lower surface of the first and second sides of the display panel.

2. The display device of claim 1, wherein the wrapping film includes:
    a first area opposite to an upper surface of the light guide plate;
    at least one second area opposite to one side surface of the light guide plate; and
    at least one third area opposite to the lower surface of the reflection sheet.

3. The display device of claim 2, wherein the wrapping film includes at least a light shield pattern.

4. The display device of claim 3, wherein the light shield pattern is in the second area and at edges of the first and third areas adjacent thereto.

5. The display device of claim 3, wherein the light shield pattern has a thickness of about 10 µM.

6. The display device of claim 1, wherein a first and second light shield layers on at least one side surface of the light guide plate, and wherein at least one among the first and second light shield layers includes a white or black material, and the first and second light shield layers are formed using a pad printing method.

7. The display device of claim 1, wherein the wrapping film is one of a tri-acetyl cellulose (TAC) film, a polyethylene terephthalate (PET) film or a polycarbonate (PC).

8. A display device comprising:
    a display panel having first and third sides substantially parallel with each other;
    a light guide plate at a lower surface of the display panel;
    a first guide panel member on a lower surface of the first side of the display panel and on a light input surface of the light guide plate;
    a second guide panel member on a lower surface of the third side of the display panel, with the first and second guide panel members supporting and guiding the display panel and with the display panel between the first and second guide panel members;
    a light source between the first guide panel member and the light input surface of the light guide plate;
    a reflection sheet at a lower surface of the light guide plate; and
    a wrapping film configured to wrap the first guide panel member, at least a part of an upper surface of the light guide plate, at least one side surface of the light guide plate and at least a part of a lower surface of the reflection sheet, but not to wrap any portion of the second guide panel member on a lower surface of the third side of the display panel.

9. The display device of claim 8, wherein the wrapping film includes:

a first area opposite to an upper surface of the light guide plate;

at least one second area opposite to one side surface of the light guide plate; and at least one third area opposite to the lower surface of the reflection sheet.

10. The display device of claim 9, wherein the wrapping film includes at least a light shield pattern.

11. The display device of claim 10, wherein the light shield pattern is in the second area and on edges of the first and third areas adjacent thereto.

12. The display device of claim 10, wherein the light shield pattern has a thickness of about 10 μM.

13. The display device of claim 10, wherein the wrapping film further includes a fourth area which expands from the top edge of the first area in another outward direction, with the exception of the second and third areas.

14. The display device of claim 13, wherein the wrapping film includes a light shield pattern in the fourth area.

15. The display device of claim 8, wherein the wrapping film is one of a tri-acetyl cellulose (TAC) film, a polyethylene terephthalate (PET) film or a polycarbonate (PC).

16. The display device of claim 8, further comprising a first light shield layer on at least one side surface of the light guide plate.

17. The display device of claim 16, further comprising a second light shield layer on at least one side surface of the light guide plate.

18. The display device of claim 17, wherein the first light shield layer includes white material, and the second light shield layer includes black material.

* * * * *